United States Patent
Rohr et al.

(10) Patent No.: US 10,782,625 B2
(45) Date of Patent: **\*Sep. 22, 2020**

(54) USE OF NOVEL NAPHTHOL AS-PIGMENT-MIXTURES IN PRINTING-MATERIALS

(71) Applicant: CLARIANT PLASTICS & COATINGS LTD, Muttenz (CH)

(72) Inventors: Ulrike Rohr, Weinheim (DE); Gemma Solduga Ramirez, Mannheim (DE); Joachim Eichhorn, Frankfurt am Main (DE)

(73) Assignee: Clariant Plastics & Coatings Ltd, Muttenz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/738,936

(22) PCT Filed: May 31, 2016

(86) PCT No.: PCT/EP2016/062298
§ 371 (c)(1),
(2) Date: Dec. 21, 2017

(87) PCT Pub. No.: WO2016/206928
PCT Pub. Date: Dec. 29, 2016

(65) Prior Publication Data
US 2018/0312704 A1    Nov. 1, 2018

(30) Foreign Application Priority Data
Jun. 25, 2015   (DE) .................. 10 2015 211 829

(51) Int. Cl.
| | |
|---|---|
| *G03G 9/09* | (2006.01) |
| *C09B 29/01* | (2006.01) |
| *C09B 67/22* | (2006.01) |
| *C09D 11/322* | (2014.01) |
| *C09D 11/40* | (2014.01) |
| *C09B 29/18* | (2006.01) |
| *C09D 11/037* | (2014.01) |
| *C09B 35/029* | (2006.01) |

(52) U.S. Cl.
CPC .......... *G03G 9/091* (2013.01); *C09B 29/0003* (2013.01); *C09B 29/18* (2013.01); *C09B 35/029* (2013.01); *C09B 67/0051* (2013.01); *C09D 11/037* (2013.01); *C09D 11/322* (2013.01); *C09D 11/40* (2013.01); *G03G 9/092* (2013.01)

(58) Field of Classification Search
CPC ...... G03G 9/091; G03G 9/092; C09B 35/029; C09B 67/0051; C09B 29/0003; C09D 11/037
See application file for complete search history.

(56) References Cited

U.S. PATENT DOCUMENTS

| | | | | | |
|---|---|---|---|---|---|
| 1,522,089 | A | * | 1/1925 | Wagner .................... | C09B 29/20 534/581 |
| 1,833,567 | A | * | 11/1931 | Glietenberg ............ | C09B 29/20 534/866 |
| 1,838,270 | A | * | 12/1931 | Laska ..................... | C09B 29/20 534/581 |

(Continued)

FOREIGN PATENT DOCUMENTS

| | | | |
|---|---|---|---|
| CN | 1315473 A | 10/2001 | |
| DE | 2448994 A1 * | 4/1976 | ............. C09B 29/00 |

(Continued)

OTHER PUBLICATIONS

Diamond, A.S. (editoir) Handbook of Imaging Materials. New York: Marcel-Dekker, Inc. (2001) pp. 164-168.*

(Continued)

*Primary Examiner* — Christopher D Rodee

(74) *Attorney, Agent, or Firm* — Morgan, Lewis & Bockius LLP

(57) ABSTRACT

The invention relates to the use of pigment mixtures which contain at least one pigment of formulas (Ia) and (Ib), wherein variables $X^1$, $X^2$, $X^3$, $X^4$, $Y^1$, $Y^2$, $Z^1$ and $Z^2$ are as

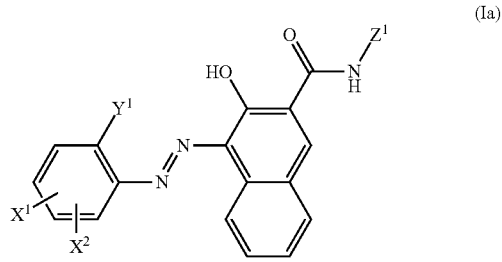

(Ia)

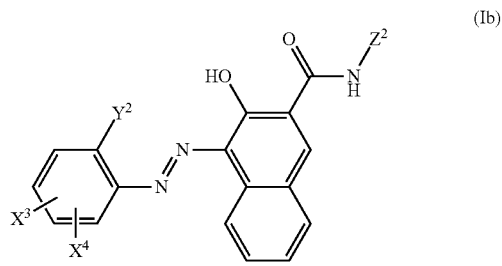

(Ib)

defined and wherein the pigment mixtures are useful as dyes in printing methods.

16 Claims, No Drawings

(56) References Cited

U.S. PATENT DOCUMENTS

| | | | | |
|---|---|---|---|---|
| 2,006,211 | A | * | 6/1935 | Fischer .................... C08K 5/23 |
| | | | | 524/190 |
| 4,997,920 | A | * | 3/1991 | Hari ..................... C08K 5/0041 |
| | | | | 106/31.77 |
| 6,271,286 | B1 | * | 8/2001 | Leidner .................. C09D 13/00 |
| | | | | 523/164 |
| 2007/0213516 | A1 | | 9/2007 | Volker et al. |
| 2007/0240618 | A1 | | 10/2007 | Rohr et al. |
| 2008/0241722 | A1 | * | 10/2008 | Schmidt ............. C09B 67/0051 |
| | | | | 430/105 |
| 2018/0187016 | A1 | * | 7/2018 | Rohr ........................ C08K 5/23 |

FOREIGN PATENT DOCUMENTS

| | | | | |
|---|---|---|---|---|
| GB | 1549726 A | * | 8/1979 | ............... G03G 9/12 |
| JP | 2004061686 A | | 2/2004 | |
| JP | 2004126120 A | | 4/2004 | |
| JP | 5707603 B2 | * | 4/2015 | |
| RU | 2152414 C1 | * | 7/2000 | |
| WO | 03/099936 A1 | | 12/2003 | |
| WO | 2005/019346 A1 | | 3/2005 | |
| WO | 2005/105928 A1 | | 11/2005 | |

OTHER PUBLICATIONS

English language machine translation of JP 5707603 B2 (Apr. 2015).*

International Search Reported dated Jul. 13, 2016, issued in International Application No. PCT/EP2016/062298.

* cited by examiner

USE OF NOVEL NAPHTHOL AS-PIGMENT-MIXTURES IN PRINTING-MATERIALS

The present invention relates to the use of novel naphthol AS pigment mixtures in printing methods, especially for electrophotographic toners, inkjet printing, in the production of color filters and in conventional printing inks.

Electrophotographic recording methods produce a "latent charge image" on a photoconductor. This latent charge image is developed by applying an electrostatically charged toner, which is then transferred, for example, to paper, textiles, films or plastic and fixed, for example, by means of pressure, radiation, heat or the effect of a solvent. Typical toners are one- or two-component powder toners (also called one- and two-component developers); in addition, specialty toners are also in use, for example magnetic or liquid toners and polymerization toners.

Coloring components used in chromatic toners are typically organic color pigments. Because of their insolubility in the application medium, color pigments have considerable advantages over dyes, for example better thermal stability and lightfastness.

In the conventional toner production processes, the colorants are incorporated (dispersed) by means of extruders or kneaders into the toner binders together with other toner constituents, such as charge control agents and waxes. For the production of toners, it is important in practice that the colorants have adequate thermal stability and good dispersibility in the respective toner binder. Typical incorporation temperatures for colorants into the toner resins, in the case of use of kneaders or extruders, are between 70 and 200° C. Accordingly, a thermal stability of 200° C., better 250° C., is highly advantageous. It is also important that thermal stability is assured over a prolonged period (about 30 minutes) and in various binder systems. Typical toner binders are polymerization resins, polyaddition resins and polycondensation resins, such as styrene resins, styrene-acrylate resins, styrene-butadiene resins, acrylate resins, polyester resins, phenol-epoxy resins, polysulfones, polyurethanes, individually or in combination, which may also comprise further constituents, such as charge control agents, waxes or flow auxiliaries, or be supplemented with these subsequently.

As well as the described process for toner production in a physical mixing process, various "chemical" processes are used in the production of modern toners, in which the toner polymer is produced in a polymerization reaction from suitable monomers or oligomers in the presence of the further constituents (colorants, charge control agents, wax, etc.) and by incorporation of the constituents mentioned. In addition, there are processes in which the desired toner particles are obtained by aggregation of polymer particles in the nanometer range to give larger particles in the micrometer range with inclusion of the toner constituents mentioned.

What these processes have in common is that the toner constituents and hence also the colorant have to be incorporated and finely dispersed in a liquid medium. In general, this is a polyphasic system (water/monomers, oligomers or water/solvent/monomer or oligomer or a latex).

The compatibility and good dispersibility of the constituents used with the reaction media used in the chemical toner production processes mentioned is of great significance for the quality of the toner. For instance, it affects chargeability, transparency and hue purity, but also the effectiveness of the production process (the constituents must not, for example, disrupt the polymerization reaction).

Liquid toners generally consist of a nonpolar solvent in which the actual toner particles in the micrometer range are finely distributed. Specific demands are made here on the solventfastness of the constituents. The remarks made above relating to compatibility and dispersibility in the carrier material used are likewise applicable.

The inkjet method is a contactless printing method in which droplets of the recording fluid from one or more nozzles are guided onto the substrate to be printed. In order to obtain prints of excellent quality, the recording fluids and the colorants present therein have to meet high demands, especially also with regard to the desired hue and reliability during the printing operation.

As well as dye-based inks, there is also increasing use of pigmented inks in inkjet printing. The fine division of the pigments present in the inks is a basic prerequisite for the use thereof in inkjet printing, firstly in order to avoid blockage of the nozzles, but secondly also in order to achieve high transparency and a desired hue.

Inkjet inks can be produced by dispersing a pigment composition into the aqueous or nonaqueous medium, into the microemulsion medium, or into the medium for production of the UV-durable ink or into the wax for production of a hotmelt inkjet ink.

Appropriately, the printing inks obtained, for inkjet applications, are then filtered (for example through a 1 µm filter).

A common factor to all printing applications is the principle of subtractive color mixing, in which the entire color spectrum visible to the human eye is produced by mixing the primary colors yellow, cyan and magenta. Only when the respective primary color meets the precisely defined color requirements is exact color rendering possible. Otherwise, some hues cannot be rendered and color contrast is inadequate. It is also important for subtractive color mixing that the individual base hues are of maximum hue purity in order to achieve brilliant color rendering.

There is a fundamental need for a magenta pigment having maximum transparency, bluishness, high color purity and good dispersibility in printing materials, especially in toner polymers or chemical toner production media, in inkjet systems and printing ink media, but also in electronic inks ("e-inks") or electronic paper ("e-paper").

Transparency is of central importance because, in full-color printing (both in the conventional methods and in the digital printing processes such as electrophotography and inkjet printing), the yellow, cyan and magenta colors are printed one on top of another, the sequence of the colors depending on the particular machine. If an upper color is not transparent enough, the lower color cannot show through it adequately and color rendering is distorted.

For the reproduction of the magenta hue, in the toners, inkjet inks and printing inks that are currently being used, various magenta pigments are in use, and pigments from the quinacridone series (P. R. 122, P.V. 19) find wide use particularly in inkjet printing and in electrophotography. Quinacridone pigments are of good suitability for this use because of their bluish magenta hue with very high chroma values. However, they are of comparatively weak color intensity, as a result of which the amount used in the ink or the toner has to be increased in order to achieve adequate hue depth. On the other hand, in the case of elevated pigment concentration in the printing inks and toners, the rheological and other application-relevant properties are adversely affected. As an alternative to quinacridones, azo pigments are used in inks and toners and in printing inks. Known azo pigments, for example P.R. 146, 147, 185, 269, are of much more intense color compared to quinacridones, but cannot cover the very bluish magenta region of the color space and are also less pure in hue. Combinations of quinacridone pigments and azo pigments are often also used in order to obtain the desired hue.

It was an object of the present invention to provide a very inexpensive, transparent, bluish and brilliant azo colorant having good dispersibility and high thermal stability for use in electrophotographic toners and developers, inkjet inks, color filters and printing inks.

It has been found that, surprisingly, the object of the invention is achieved by combinations of various naphthol AS pigments that are described hereinafter.

The present invention provides for the use of mixtures of naphthol AS pigments which comprise at least one naphthol AS pigment of each of the formulae (Ia) and (Ib)

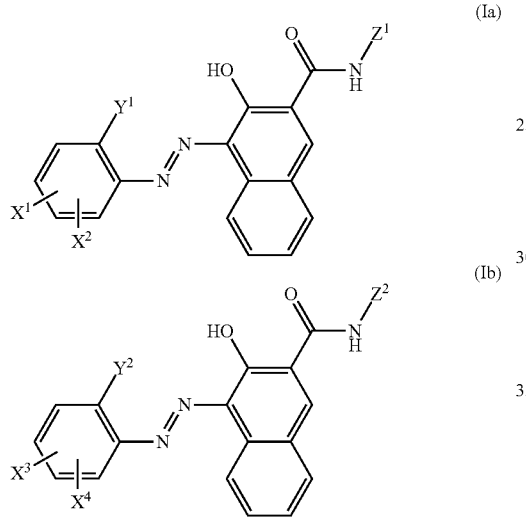

in which, independently of one another, $X^3$ are carbamoyl, $C_1$-$C_4$-alkylcarbamoyl, di($C_1$-$C_4$)-alkylcarbamoyl, sulfamoyl, phenylsulfamoyl, $C_1$-$C_4$-alkylsulfamoyl or di($C_1$-$C_4$)-alkylsulfamoyl;

$X^2$, $X^4$ are hydrogen, $C_1$-$C_4$-alkyl, $C_1$-$C_4$-alkoxy, halogen or nitro;

$Y^1$, $Y^2$ are hydrogen, halogen or $C_1$-$C_4$-alkyl, $C_1$-$C_4$-alkoxy or $C_1$-$C_4$-alkoxycarbonyl; and $Z^1$, $Z^2$ are hydrogen, phenyl, naphthyl, benzimidazolonyl, substituted phenyl or substituted naphthyl, where the substituents are 1, 2, 3 or 4 in number and are selected from the group of halogen, nitro, cyano, $C_1$-$C_4$-alkoxycarbonyl, carbamoyl, $C_1$-$C_4$-alkylcarbamoyl, di($C_1$-$C_4$)-alkylcarbamoyl, phenylcarbamoyl, sulfamoyl, phenylsulfamoyl, $C_1$-$C_4$-alkylsulfamoyl, di($C_1$-$C_4$)-alkylsulfamoyl, $C_1$-$C_4$-acylamino, $C_1$-$C_4$-alkyl and $C_1$-$C_4$-alkoxy, and where the pigments of the formulae (Ia) and (Ib) are different, as colorant in printing methods.

In the above formulae, $X^1$, $X^3$ are preferably carbamoyl, $C_1$-$C_4$-alkylcarbamoyl, di($C_1$-$C_4$)-alkylcarbamoyl, more preferably carbamoyl, $C_1$-$C_2$-alkylcarbamoyl or di($C_1$-$C_2$)-alkylcarbamoyl.

In the above formulae, $X^2$, $X^4$ are preferably hydrogen, $C_1$-$C_4$-alkyl or $C_1$-$C_4$-alkoxy, more preferably hydrogen.

In the above formulae, $Y^1$, $Y^2$ are preferably $C_1$-$C_4$-alkyl or $C_1$-$C_4$-alkoxy, more preferably methyl, ethyl, methoxy or ethoxy.

In the above formulae, $Z^1$, $Z^2$ are preferably hydrogen, phenyl, or nitro-, cyano-, halogen-, $C_1$-$C_4$-alkyl- and/or $C_1$-$C_4$-alkoxy-substituted phenyl, more preferably phenyl or nitro-, methyl-, ethyl-, methoxy- and/or ethoxy-substituted phenyl.

Preference is given in the context of the present invention to mixtures of naphthol AS pigments each comprising at least one naphthol AS pigment of the formulae (IIa) and (IIb)

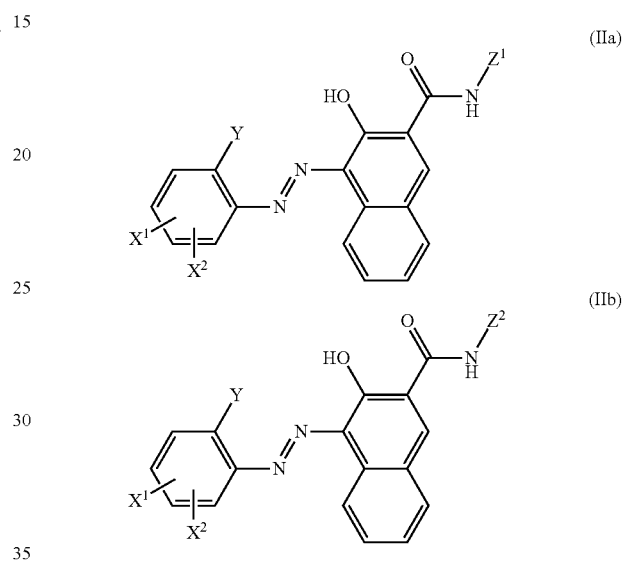

in which, independently of one another, $X^1$ is carbamoyl, $C_1$-$C_4$-alkylcarbamoyl, di($C_1$-$C_4$)-alkylcarbamoyl, sulfamoyl, phenylsulfamoyl, $C_1$-$C_4$-alkylsulfamoyl or di($C_1$-$C_4$)-alkylsulfamoyl;

$X^2$ is hydrogen, $C_1$-$C_4$-alkyl, $C_1$-$C_4$-alkoxy, halogen or nitro;

Y is hydrogen, halogen, $C_1$-$C_4$-alkyl, $C_1$-$C_4$-alkoxy or $C_1$-$C_4$-alkoxycarbonyl; and $Z^1$, $Z^2$ are hydrogen, phenyl, naphthyl, benzimidazolonyl, substituted phenyl or substituted naphthyl, where the substituents are 1, 2, 3 or 4 in number and are selected from the group of halogen, nitro, cyano, $C_1$-$C_4$-alkoxycarbonyl, carbamoyl, $C_1$-$C_4$-alkylcarbamoyl, di($C_1$-$C_4$)-alkylcarbamoyl, phenylcarbamoyl, sulfamoyl, phenylsulfamoyl, alkylsulfamoyl, di($C_1$-$C_4$)-alkylsulfamoyl, $C_1$-$C_4$-acylamino, $C_1$-$C_4$-alkyl and $C_1$-$C_4$-alkoxy, and where the pigments of the formulae (IIa) and (IIb) are different.

Particular preference is given to above-described mixtures where $X^2$ is defined as hydrogen.

Very particular preference is given to above-described mixtures where $X^2$ is defined as hydrogen and $X^1$ is in the para position to Y.

In the above formulae, halogen is preferably F, Cl or Br, especially Cl.

Especially preferred in the context of the invention are mixtures of naphthol AS pigments each comprising at least one naphthol AS pigment of the formulae (IIIa) and (IIIb)

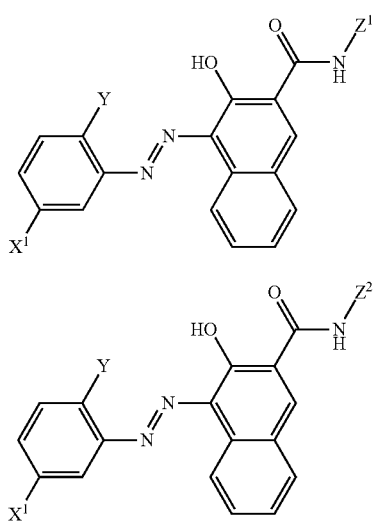

(IIIa)

(IIIb)

in which, independently of one another, $X^1$ is defined as carbamoyl, $C_1$-$C_2$-alkylcarbamoyl or di($C_1$-$C_2$)-alkylcarbamoyl;

Y is defined as methyl, methoxy, ethyl or ethoxy;

$Z^1$ is defined as phenyl or as phenyl substituted by one, two or three radicals from the group of methyl, ethyl, methoxy, ethoxy, chlorine;

$Z^2$ is defined as nitrophenyl or cyanophenyl.

Of particular interest are mixtures of naphthol AS pigments each comprising at least one naphthol AS pigment of the above formulae (IIIa) and (IIIb), in which $X^1$ is defined as carbamoyl, methylcarbamoyl or ethylcarbamoyl;

Y is defined as methoxy or ethoxy;

$Z^1$ is defined as methylphenyl, ethylphenyl, methoxyphenyl or ethoxyphenyl; and $Z^2$ is defined as nitrophenyl or cyanophenyl.

Of very particular interest are mixtures of naphthol AS pigments each comprising at least one naphthol AS pigment of the above formulae (IIIa) and (IIIb), in which $X^1$ is defined as carbamoyl or methylcarbamoyl;

Y is defined as methoxy;

$Z^1$ is defined as methylphenyl, especially o-methylphenyl; and $Z^2$ is defined as nitrophenyl, especially m-nitrophenyl.

The pigment mixtures used in accordance with the invention appropriately contain 1% to 99% by weight of a component of the formula (Ia), (IIa) or (IIIa) and 99% to 1% by weight of a component of the formula (Ib), (IIb) or (IIIb), preferably 5% to 95% by weight of a component of the formula (Ia), (IIa) or (IIIa) and 95% to 5% by weight of a component of the formula (Ib), (IIb) or (IIIb), more preferably 10% to 90% by weight of a component of the formula (Ia), (IIa) or (IIIa) and 90% to 10% by weight of a component of the formula (Ib), (IIb) or (IIIb), even more preferably 25% to 75% by weight of a component of the formula (Ia), (IIa) or (IIIa) and 75% to 25% by weight of a component of the formula (Ib), (IIb) or (IIIb), especially 40% to 60% by weight of a component of the formula (Ia), (IIa) or (IIIa) and 60% to 40% by weight of a component of the formula (Ib), (IIb) or (IIIb), based in each case on the total weight of the pigment mixture.

The pigment mixtures used in accordance with the invention optionally contain one or more additional colorants of the formula (IV) in proportions of up to 10% by weight, for example from 0.1% to 10% by weight, based on the total weight of the pigment mixture,

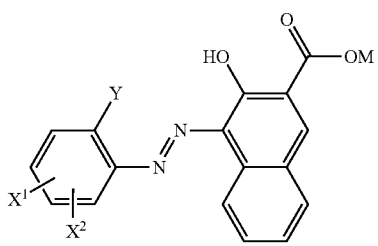

(IV)

in which $X^1$, $X^2$, Y have one of the definitions given above and

M is hydrogen, an alkali metal, an alkaline earth metal or ammonium.

The pigment mixtures used in accordance with the invention may additionally optionally comprise one or more residual couplers from the group of the β-naphthol derivatives of the formulae (VIa) and/or (VIb) in proportions of up to 10% by weight, for example from 0.1% to 10% by weight, based on the total weight of the pigment mixture,

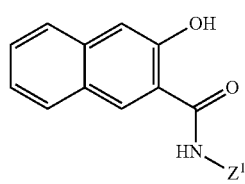

(VIa)

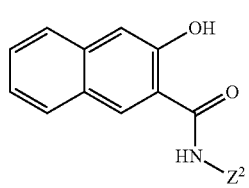

(VIb)

in which $Z^1$ and $Z^2$ have one of the definitions given above.

The pigment mixtures used in accordance with the invention can be prepared by diazotization of amines of the formulae (Va) and (Vb)

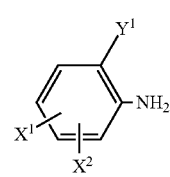

(Va)

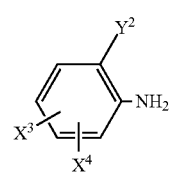

(Vb)

in the acidic medium and subsequent coupling of the diazonium compounds thus obtained to a mixture of at least two coupling components of the formulae (VIa) and (VIb)

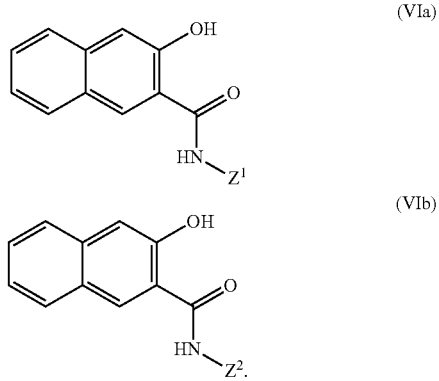

Subsequently, the pigment suspension obtained can be filtered and the moist presscake obtained can appropriately be dried to constant weight.

In the case that the amines of the formulae (Va) and (Vb) are the same, two equivalents of the amine in question are correspondingly diazotized and coupled as described above.

The diazotization and coupling can be conducted by commonly known methods and are described in published PCT application WO/2016/207113.

The pigment mixtures used in accordance with the invention may also comprise auxiliaries, for example surfactants, pigmentary or nonpigmentary dispersants, fillers, standardizers, resins, waxes, defoamers, dust suppressants, extenders, shading colorants, preservatives, drying retardants, rheology control additives, wetting agents, antioxidants, UV absorbers, light stabilizers, or a combination thereof.

The addition of the auxiliaries can be effected at a particular time before, during or after the reaction/synthesis, all at once or in several portions. The auxiliaries can be added, for example, directly to the solutions or suspensions of the reactants, or else during the reaction in liquid, dissolved or suspended form.

The total amount of the auxiliaries added may be 0% to 40% by weight, preferably 1% to 30% by weight, more preferably 2.5% to 25% by weight, based on the total weight of the pigment mixture plus auxiliaries.

Useful surfactants include anionic or anion-active, cationic or cation-active and nonionic substances or mixtures of these agents.

Examples of surfactants and pigmentary and nonpigmentary dispersants which can be used for the process of the invention are specified in EP-A-1 195 411.

Examples of shading colorants include pigments selected from the group of the azo pigments and/or polycyclic pigments, for example yellow pigments, such as C.I. Pigment Yellow 155, P.Y. 139, P.Y. 83, P.Y. 181, P.Y. 191, P.Y. 75, P.Y. 180 or P.Y. 97; orange pigments, such as Pigment Orange 62, P.O. 36, P.O. 34, P.O. 13, P.O. 36, P.O. 13, P.O. 43, P.O. 5 or P.O. 73; red/magenta pigments, such as Pigment Red 57, P.R. 48, P.R. 122, P.R. 146, P.R. 147, P.R. 269, P.R. 154, P.R. 185, P.R. 184, P.R. 192, P.R. 202, P.R. 207, P.R. 206, P.R. 209 or P.R. 254; and violet pigments, such as Pigment Violet 19, P.V. 23, P.V. 29, P.V. 35 or P.V. 37, P. V. 42, P.V. 57 and likewise blue pigments, such as Pigment Blue 15, P.B. 60 or P.B. 80.

Particularly preferred mixing partners are quinacridones, for example P. R. 122, P. R. 202, P. V. 19 and quinacridone cocrystals composed of two or more components, and further azo pigments from the group of the naphthol AS pigments, for example P.R. 184, P.R. 185, P.R. 176, P.R. 269, P.R. 146, P. R. 147, P.R. 150.

Preferred dyes which can be used for shading of the pigment mixtures of the invention are water-soluble dyes from the group of the direct dyes, reactive dyes and acid dyes, and also dyes from the group of the solvent dyes, disperse dyes and vat dyes. Specific examples of these include C.I. Reactive Yellow 37, Acid Yellow 23, Reactive Red 23, 180, Acid Red 52, 92, Reactive Blue 19, 21, Acid Blue 9, Direct Blue 199, Solvent Yellow 14, 16, 25, 56, 64, 79, 81, 82, 83:1, 93, 98, 133, 162, 174, Solvent Red 8, 19, 24, 49, 52, 89, 90, 91, 109, 118, 119, 122, 127, 135, 149, 160, 195, 196, 197, 212, 215, Solvent Blue 44, 45, Solvent Orange 60, 63, Disperse Yellow 64, Disperse Red 11, Vat Red 41, Vat Violet 3, Basic Red 1, Basic Violet 10, 11.

"Pigment composition used in accordance with the invention" is used hereinafter to refer to the naphthol AS pigment mixtures used in accordance with the invention, which may contain one or more of the aforementioned auxiliaries.

The pigment compositions of the invention, when used in toners, inkjet inks, color filters and printing ink systems, give bluish magenta shades that are ideally suitable for subtractive color mixing. In this case, the pigment compositions of the invention can be used either as the sole colorant or in mixtures with other pigments or dyes as described above.

In the context of the present invention, printing methods are understood to mean either conventional printing methods on paper, card, textiles or plastics, for example offset printing, flexographic printing or intaglio printing, or non-impact printing methods, for example in electrophotography, in inkjet printing, electronic inks and production of color filters.

The present invention further provides a printing ink, for example an offset printing ink, flexographic printing ink or intaglio printing ink, comprising an above-described pigment composition, appropriately in a concentration of 5% to 15% by weight, based on the total weight of the printing ink.

The present invention further provides an electrophotographic toner or developer comprising an above-described pigment composition, appropriately in a concentration of 1% to 20% by weight, preferably 3% to 15% by weight, based on the total weight of the toner or developer. Toners and developers are, for example, one- or two-component powder toners (also called one- or two-component developers), magnetic toners, liquid toners, latex toners, polymerization toners and specialty toners. These may be used either in the conventional toner production processes by means of extrusion or else in chemical toner production processes such as emulsion aggregation, suspension polymerization or others. By contrast with the conventional toner production process in which the pigment is incorporated into a toner carrier material (polystyrene, polyester or the like) together with other constituents, pigments in the chemical toner processes generally have to be finely dispersed in liquid media (for example by means of a bead mill).

The present invention further provides an inkjet ink comprising an above-described pigment composition, appropriately in a concentration of 0.5% to 50% by weight, preferably 1% to 30% by weight, based on the total weight of the inkjet ink. Inkjet inks include water-based and non-water-based inks, microemulsion inks, UV inks and inks that work by the hotmelt method.

Water-based inkjet inks contain essentially 0.5% to 30% by weight, preferably 1 to 15% by weight, of the pigment composition, 70% to 95% by weight of deionized water, suitable dispersing aids, optionally carrier polymer and/or humectant.

Solvent-based inkjet inks contain essentially 0.5% to 30% by weight, preferably 1% to 15% by weight, of the pigment composition, 70% to 95% by weight of an organic solvent or solvent mixture and/or a hydrotropic compound. Optionally, the solvent-based inkjet inks may comprise carrier materials and binders that are soluble in the "solvent", for example polyolefins, natural and synthetic rubber, polyvinyl chloride, vinyl chloride/vinyl acetate copolymers, polyvinyl butyrals, wax/latex systems or combinations of these compounds.

Optionally, the solvent-based inkjet inks may also comprise further additives, for example wetting agents, degassers/defoamers, preservatives and antioxidants.

Microemulsion inks are based on organic solvents, water and optionally a surfactant. Microemulsion inks appropriately contain 0.5% to 30% by weight, preferably 1% to 15% by weight, of the pigment composition, 0.5% to 95% by weight of water and 0.5% to 95% by weight of organic solvents and/or interface mediators.

UV inks typically consist of monomers of low molecular weight mono-, di-, tri-, tetra- and/or pentafunctional acrylates and/or acrylate-, urethane-, epoxy- or polyester-based oligomers. The UV inks are typically initiated/crosslinked by cationic, anionic or free-radical means.

UV-curable inks contain essentially 0.5% to 30% by weight of the pigment composition, 0.5% to 95% by weight of water, 0.5% to 95% by weight of an organic solvent or solvent mixture, 0.5% to 50% by weight of a radiation-curable binder and 0% to 10% by weight of a photoinitiator.

Hotmelt inks are usually based on waxes, fatty acids, fatty alcohols or sulfonamides that are solid at room temperature and become liquid when heated, the preferred melting range being between about 60° C. and about 140° C. Hotmelt inkjet inks consist essentially of 20% to 90% by weight of wax and 1% to 10% by weight of the pigment composition. In addition, 0% to 20% by weight of an additional polymer (as "dye dissolver"), 0% to 5% by weight of dispersants, 0% to 20% by weight of viscosity modifiers, 0% to 20% by weight of plasticizers, 0% to 10% by weight of tackifying additive, 0% to 10% by weight of transparency stabilizer (prevents, for example, the crystallization of the wax) and 0% to 2% by weight of antioxidant may be present.

The inventive toners and developers and inkjet inks are typically used in toner cartridge sets or in ink sets consisting of yellow, magenta, cyan and black toners or inks which correspondingly comprise color pigments and/or dyes as colorants. In addition, they can be used in toner sets or ink sets that additionally comprise one or more spot colors, for example orange, green, blue and/or special colors (gold, silver).

Preference is given here to a set of printing inks or toner cartridges wherein the black preparation preferably comprises carbon black as colorant, especially a gas black or furnace black; wherein the cyan preparation comprises one or more pigments from the group of the phthalocyanine pigments, optionally shaded with Pigment Blue 16, Pigment Blue 56, Pigment Blue 60 or Pigment Blue 61; wherein the magenta preparation preferably comprises a pigment composition of the invention, optionally shaded with a pigment from the group of the monoazo, disazo, β-naphthol, naphthol AS, laked azo, metal complex, benzimidazolone, anthanthrone, anthraquinone, quinacridone, dioxazine, perylene, thioindigo, triarylcarbonium or diketopyrrolopyrrole pigments; wherein the yellow preparation preferably comprises a pigment from the group of the monoazo, disazo, benzimidazoline, isoindolinone, isoindoline or perinone pigments, especially the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 120, Pigment Yellow 126, Pigment Yellow 127, Pigment Yellow 128, Pigment Yellow 139, Pigment Yellow 150, Pigment Yellow 151, Pigment Yellow 154, Pigment Yellow 155, Pigment Yellow 173, Pigment Yellow 174, Pigment Yellow 175, Pigment Yellow 176, Pigment Yellow 180, Pigment Yellow 181, Pigment Yellow 191, Pigment Yellow 194, Pigment Yellow 196, Pigment Yellow 213 or Pigment Yellow 219; wherein the orange preparation preferably comprises a pigment from the group of the disazo, β-naphthol, naphthol AS, benzimidazolone or perinone pigments, especially the Colour Index pigments Pigment Orange 5, Pigment Orange 13, Pigment Orange 34, Pigment Orange 36, Pigment Orange 38, Pigment Orange 43, Pigment Orange 62, Pigment Orange 68, Pigment Orange 70, Pigment Orange 71, Pigment Orange 72, Pigment Orange 73, Pigment Orange 74 or Pigment Orange 81; wherein the green preparation preferably comprises a pigment from the group of the phthalocyanine pigments, especially the Colour Index pigments Pigment Green 7 or Pigment Green 36.

In addition, the ink sets and toner cartridges may also comprise shading dyes, preferably from the group of C.I. Acid Yellow 3, C.I. Food Yellow 3, C.I. Acid Yellow 17 and C.I. Acid Yellow 23; C.I. Direct Yellow 86, C.I. Direct Yellow 28, C.I. Direct Yellow 51, C.I. Direct Yellow 98 and C.I. Direct Yellow 132; C.I. Reactive Yellow 37; C.I. Direct Red 1, C.I. Direct Red 11, C.I. Direct Red 37, C.I. Direct Red 62, C.I. Direct Red 75, C.I. Direct Red 81, C.I. Direct Red 87, C.I. Direct Red 89, C.I. Direct Red 95 and C.I. Direct Red 227; C.I. Acid Red 1, C.I. Acid Red 8, C.I. Acid Red 18, C.I. Acid Red 52, C.I. Acid Red 80, C.I. Acid Red 81, C.I. Acid Red 82, C.I. Acid Red 87, C.I. Acid Red 94, C.I. Acid Red 115, C.I. Acid Red 131, C.I. Acid Red 144, C.I. Acid Red 152, C.I. Acid Red 154, C.I. Acid Red 186, C.I. Acid Red 245, C.I. Acid Red 249 and C.I. Acid Red 289; C.I. Reactive Red 21, C.I. Reactive Red 22, C.I. Reactive Red 23, C.I. Reactive Red 35, C.I. Reactive Red 63, C.I. Reactive Red 106, C.I. Reactive Red 107, C.I. Reactive Red 112, C.I. Reactive Red 113, C.I. Reactive Red 114, C.I. Reactive Red 126, C.I. Reactive Red 127, C.I. Reactive Red 128, C.I. Reactive Red 129, C.I. Reactive Red 130, C.I. Reactive Red 131, C.I. Reactive Red 137, C.I. Reactive Red 160, C.I. Reactive Red 161, C.I. Reactive Red 174 and C.I. Reactive Red 180, C.I. Acid Violet 48, C.I. Acid Violet 54, C.I. Acid Violet 66, C.I. Acid Violet 126, C.I. Acid Blue 1, C.I. Acid Blue 9, C.I. Acid Blue 80, C.I. Acid Blue 93, C.I. Acid Blue 93:1, C.I. Acid Blue 182, C.I. Direct Blue 86, C.I. Direct Blue 199, C.I. Acid Green 1, C.I. Acid Green 16, C.I. Acid Green 25, C.I. Acid Green 81, C.I. Reactive Green 12, C.I. Acid Brown 126, C.I. Acid Brown 237, C.I. Acid Brown 289, C.I. Acid Black 194, C.I. Sulphur Black 1, C.I. Sulphur Black 2, C.I. Sol. Sulphur Black 1, C.I. Reactive Black 5, C.I. Reactive Black 31, C.I. Reactive Black 8; where the reactive dyes may also be present in their partly or fully hydrolyzed form.

In addition, the pigment compositions of the invention are also suitable as colorants for color filters, both for additive and for subtractive color generation, and as colorants for electronic inks ("e-inks") or electronic paper ("e-paper").

In the production of color filters, both reflective and transparent color filters, pigments in the form of a paste or as pigmented photoresists in suitable binders (acrylates, acrylic esters, polyimides, polyvinyl alcohols, epoxides, polyesters, melamines, gelatins, caseins) are applied to the respective LCD components (e.g. TFT-LCDs=thin-film transistor liquid-crystal displays or, for example, (S) TN-LCD=(super) twisted nematic-LCD). As well as high thermal stability, a high pigment purity (chroma) is also a prerequisite for a stable paste or a pigmented photoresist. Furthermore, the pigmented color filters can also be applied by inkjet printing methods or other suitable printing methods.

Synthesis Example 1 a) Preparation of the diazonium salt solution:

2200 g of demineralized water are initially charged, 180 g of N-methyl-3-amino-4-epoxybenzamide (1.0 mol) are scattered in and the mixture is stirred homogeneously at room temperature. After 15 minutes, the mixture is cooled to 2° C. by adding 800 g of ice and by additional external cooling, and then 290 g of hydrochloric acid (31%) are added. The precipitated hydrochloride is diazotized by adding 179 g of sodium nitrite solution (40%) at 5 to 10° C. over the course of 15 to 20 minutes. The diazonium salt solution is stirred in an excess of nitrite for 1.5 h, then a clarifying aid is added and then the mixture is filtered and any nitrite excess is eliminated by addition of amidosulfonic acid.

b) Preparation of a solution of the coupling component mixture:

2000 g of water are initially charged and 186 g (0.67 mol) of N-(2-methylphenyl)-3-hydroxynaphthalene-2-carboxamide and 103 g (0.33 mol) of N-(3-nitrophenyl)-3-hydroxynaphthalene-2-carboxamide are introduced while stirring, and the mixture is heated to 95° C. and dissolved under alkaline conditions by adding 330 g of sodium hydroxide solution (33%) at 90 to 95° C. within 2 minutes. Subsequently, the mixture is cooled to from 80 to 60° C. and kept at this temperature. The warm solution can optionally still be filtered with addition of a clarifying aid.

c) Azo coupling:

The clarified diazonium salt solution from a) is initially charged, adjusted to pH 4.3 to 4.5 by adding about 38 g of sodium acetate (in the form of a 4 N solution) and cooled to 10° C. Thereafter, the coupler solution from b) is metered in over the course of 1 to 1.5 h while stirring, while keeping the pH at 4.8 to 5 by simultaneous addition of a total of about 190 g of hydrochloric acid (31%). Subsequently, the mixture is stirred for about 2.5 to 3 h or until the disappearance of the diazo component at RT to 30° C. and pH 5 to 6. After the coupling reaction has ended, the mixture is heated to about 50° C. for another 1 h, then filtered and washed with water. After drying and grinding, 480 g of a bluish dark red pigment mixture containing the following pigments of the formulae (1) and (2) in a mass ratio of 65:35 are obtained.

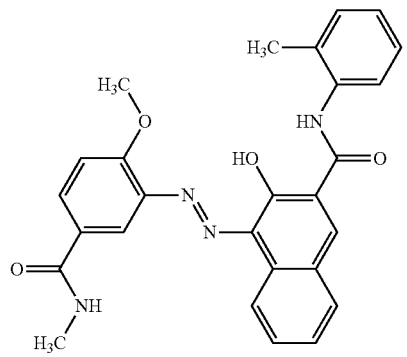

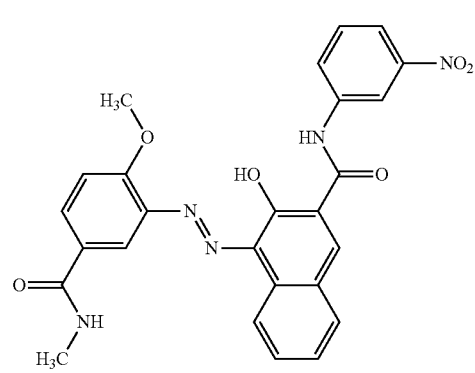

Synthesis Example 2 a) The preparation of the diazonium salt solution is effected analogously to synthesis example 1 a).

b) The preparation of the solution of the coupling component mixture is effected analogously to synthesis example 1 b), except using 139 g (0.5 mol) of N-(2-methylphenyl)-3-hydroxynaphthalene-2-carboxamide and 154 g (0.5 mol) of N-(3-nitrophenyl)-3-hydroxynaphthalene-2-carboxamide.

c) The azo coupling is effected analogously to synthesis example 1 c). After drying and grinding, 484 g of a bluish dark red pigment mixture containing the pigments of the formulae (1) and (2) in a mass ratio of 48.4:51.6 are obtained.

Use examples:

A) Coloristic properties of the pigment compositions in a toner system:

a) Test toner:

For production of a polyester-based test toner, the pigment compositions are dispersed in a concentration of 3% to 5% in a commercial toner resin (Finetone® T 382 ES polyester; from Reichhold). For this purpose, the polyester is melted in a laboratory kneader and the pigment composition is introduced in portions. The dispersion time after the introduction of the last pigment portion is 45 min.

b) Test system and analysis:

In order to obtain coloristic data in a toner medium that are very substantially independent of the type of machine used and not dependent on electrostatic chargeability, transfer rate, etc., the coloristic properties of the pigment composition used are assessed by dissolving the test toner produced above in a solvent resin (30% Finetone® 382 ES in THF/ethyl acetate) and then applying it with a No. 5 manual coating bar with a wet film thickness of 50 μm to white test cards with/without black bars, 100×230 mm, 300 g/m². The application contains 2.5% pigment composition in each case.

The color intensity and color coordinates (Table 1) were measured according to DIN 5033-7 ISO 7724-2 by means of a spectrophotometer (D65-10° observer; d/8° measurement geometry with inclusion of luster). The spectral reflection is measured, and the color measurements are evaluated in the CIELAB system (DIN 6170, ISO7724-3). The relative color intensity is ascertained via the weighted K/S sum (DIN EN ISO 787-26).

The optical density (OD) was measured according to DIN 16536 by means of a Gretag Macbeth densitometer with 45°/0°° ring optics according to DIN 5033.

TABLE 1

| Test toner with | L* | a* | b* | Color intensity in % | C | H | OD |
|---|---|---|---|---|---|---|---|
| 5% synthesis example 1 | 47.1 | 58.9 | −10.3 | 130 | 59.74 | 348.66 | 1.65 |
| 3.5% synthesis example 1 | 51.0 | 56.8 | −16.1 | 100 | 58.81 | 344.51 | 1.33 |
| 5% PR269 (comparative) | 51.6 | 54.6 | −13.5 | 96 | 56.29 | 346.49 | 1.25 |
| 5% PR184 (comparative) | 52.0 | 55.9 | −12.5 | 96 | 57.08 | 347.41 | 1.19 |

The pigment composition of the invention in this test system attains a much higher color intensity and a higher optical density (OD) than other naphthol azo pigments (e.g. PR 269, PR 184) that are typically used in toners. At the same time, the chroma value C is higher.

c) Coloristic studies by means of a paint shaker (table 2):

1 g of pigment or pigment composition is dispersed with 50 g of 30% Finetone resin (30% Finetone® T 382 ES in ethyl acetate) and 25 g of mixed oxide beads (0.8 mm Y-stabilized zirconia beads) on a paint shaker for 3 hours. The colored solution is applied to paper (Algro Finess 80 g/m²) and transparent film (Treofan® GND 50) with a laboratory printing machine (labratester) (potentiometer 280, corresponding to 10 m/min). The sample and reference are applied here alongside one another. Three fields with different layer thicknesses are printed. The coloristic data are determined in the 3rd field (wet film thickness 34 μm) (table 2).

TABLE 2

| Example | Pigment composition | a* | b* | C | $h_{ab}$ | OD |
|---|---|---|---|---|---|---|
| 1 | Synthesis example 1 (100%) | 51.56 | 13.48 | 53.29 | 345.35 | 0.98 |
| 2 | Synthesis example 1 (90%) P. R. 122 (10%) | 50.16 | −13.94 | 52.06 | 344.46 | 0.93 |
| 3 | Synthesis example 1 (80%) P. R. 122 (20%) | 49.67 | −15.32 | 51.98 | 342.85 | 0.90 |
| 4 | Synthesis example 1 (70%) P. R. 122 (30%) | 49.05 | −15.3 | 51.38 | 342.68 | 0.88 |
| 5 | Synthesis example 1 (50%) P. R. 122 (50%) | 47.29 | −15.8 | 49.86 | 341.52 | 0.81 |
| 6 (comp.) | P. R. 269 (50%) P. R. 122 (50%) | 43.61 | −14.04 | 45.82 | 342.15 | 0.70 |
| 7 (comp.) | P. R. 269 (33%) P. R. 122 (66%) | 42.94 | −15.1 | 45.52 | 340.62 | 0.68 |
| 8 (comp.) | P. R. 269 | 46.34 | −11.81 | 47.82 | 345.71 | 0.80 |
| 9 (comp.) | P. R. 122 | 41.48 | −16.67 | 44.7 | 338.11 | 0.60 |

Examples 6 to 9 (comparative) are pigments and pigment mixtures customarily used in the toner sector.

All pigment compositions of the invention have higher chroma values C than the pigments or pigment mixtures customarily used.

All pigment compositions of the invention have higher optical densities OD than the pigments or pigment mixtures customarily used.

d) Comparison with known magenta-colored azo pigments:

The same test method as in Ab) was used to make a coloristic comparison of inventive pigment compositions and various commercially available azo pigments with the magenta pigment C.I. Pigment Red 184 (table 3).

TABLE 3

| Example | Pigment | Color intensity | dH | dC | dL | da | db | transp. |
|---|---|---|---|---|---|---|---|---|
| Reference | P. R. 184 | 100 | 0 | 0 | 0 | 0 | 0 | ref |
| 10 | Synth. ex. 1 | 120 | −2.4 | 1.14 | −0.53 | 0.49 | −2.61 | 4tra |
| 11 | Synth. ex. 2 | 133 | −3.66 | 0.77 | −0.91 | −0.42 | −3.72 | 5 tra |
| 12 (comp.) | PR 269 | 93 | 0.38 | 0.17 | 0.31 | 0.26 | 0.33 | 2tra |
| 13 (comp.) | PR 185 | 96 | 10.47 | 0.55 | 1.4 | 2.23 | 10.24 | 4op |
| 14 (comp.) | PR 176 | 101 | 10.43 | 1.79 | 1.86 | 3.46 | 10 | 2op |
| 16 (comp.) | PR 146 | 84 | 8.38 | −0.63 | 1.13 | 0.91 | 8.35 | 3op |
| 18 (comp.) | PR 57:1 | 91 | 3.4 | −3.27 | 0.25 | −2.34 | 4.09 | 2 op |
| 19 (comp.) | PR 147 | 93 | 0.46 | −1.13 | −0.08 | −0.96 | 0.75 | 3 op |

Only the pigment compositions of the invention have high color intensities, a distinctly bluer hue and a positive chroma value compared to the reference, and they also exhibit improved transparency compared to commercial pigments (comparative examples 12-19).

e) Test in chemical toners:

In the production of suspension polymerization toners, a polymerization for production of the toner particles in the μm range is conducted in a biphasic system composed of water and monomer (styrene, acrylates). In order that the particles obtained are colored in the desired hue, the pigment must be finely dispersed in the monomer phase and must not be transferred from the monomer phase to the aqueous phase during the process either. In other words, the pigment must have a certain affinity for the monomer mixture used and must not be too hydrophilic, since it would then be transferred to the aqueous phase or remain at the interface between monomer and water.

For examination of this property, the procedure is as follows: 2.5 g of pigment, 50 g of styrene are dispersed with 150 g of glass beads in a paint shaker for 60 min. After the beads have been removed, 9 g in each case of the pigment dispersion thus produced are added to aqueous solutions having pH 11.4, 6.9 and 1.5 in 3 different beakers. Subsequently, the 3 solutions are stirred by means of a magnetic stirrer for 30 min. After the stirrer has been switched off, the phase separation and the whereabouts of the pigment (in the monomer phase or the aqueous phase) are visually assessed. Subsequently, the solutions are heated to 80° C. and stirred once again for 30 min. After the stirrer has been switched off, the phase separation and the whereabouts of the pigment are visually assessed.

Assessment: The quality of the phase separation is assessed visually for each of the 6 individual tests and "rated" with numbers from 1 to 3, 1 being the best rating. Then the mean from the 6 individual assessments is formed for each sample. The lower this value, the better the suitability of the pigment for a suspension polymerization process; values less than 2 show that the pigment has suitable hydrophobicity (table 4).

TABLE 4

| | Rating | | |
|---|---|---|---|
| | 1 | 2 | 3 |
| Observation | Aqueous phase clear and uncolored | Aqueous phase slightly colored, but transparent | Pigment in the aqueous phase |

In this test, the pigment compositions of the invention according to synthesis examples 1 and 2 achieve a value (hydrophobicity index) of 1.7 and are thus of good suitability for use in suspension polymerization processes.

In addition, it is important in the dispersing of the pigments that the resulting dispersion in the monomer solution has a low viscosity value (<100 mPas). The inventive pigment formulation from synthesis examples 1 and 2 achieves, for example, a value of 36 mPas or 45 mPas, measured in a 5% dispersion of the pigment in styrene by means of a plate-cone rotary viscometer (6 mm/2° cone) at 250 s$^{-1}$. This too shows that these pigment compositions are suitable for use in chemical toners such as suspension polymerization toners.

f) Electrostatic Properties of the Toner:

An important performance property of a toner is its electrostatic charging characteristics. These are affected to a greater or lesser degree by the pigments used. In order to assess the effect of the pigment on the charging characteristics of the toner, a test toner is produced and then the electrostatic chargeability of this test toner is measured by means of a Q/M meter.

5 parts of the inventive pigment composition from synthesis example 1 are incorporated homogeneously in powder form by means of a kneader into 95 parts of a toner binder (styrene acrylate: Almacryl B 1501) within 30 min. This is followed by grinding in a universal laboratory mill and then classification in a centrifugal sifter. The desired particle fraction (4-25 μm) is activated with a carrier consisting of styrene-methacrylate copolymer-coated magnetite particles of size 50-200 mm (bulk density 2.62 g/cm$^3$) (FBM 100 A, from Powder Tech). The measurement is effected with a conventional Q/M test bench. By using a sieve with a mesh size of 25 μm, it is ensured that no carrier is entrained when the toner is blown out. The measurements are effected at about 50% relative air humidity and 22° C. Depending on the activation time, the following Q/M values are measured (table 5).

TABLE 5

| Pigment | Charge control agent | Triboelectrical charge in μC/g after activation | | | | |
|---|---|---|---|---|---|---|
| | | 5 min | 10 min | 30 min | 2 h | 24 h |
| 5% synth. ex. 1 | none | −10 | −11 | −12 | −14 | −15 |
| 5% synth. ex. 1 | with 2% Bontron ® E 84 | −23 | −27 | −30 | −33 | −32 |

The test results show that the pigment composition supports the negative charging of the toner resin (charge without pigment about −5 μC/g), but is not too significantly dominant, and so the addition of a small amount of a charge control agent can adjust the toner charge according to the requirements.

B) Use in inkjet inks:

a) Coloristic properties in solvent inkjet inks:

To test the coloristic properties of the pigment compositions of the invention, first of all, a pigment concentrate (3.5% pigment, 1.75% dispersing additive (Disperbye® 2163), 9.5% VC/VAc copolymer, 85% solvent mixture (cyclohexanone/butoxyethyl acetate=5/95)) was produced. For this purpose, the constituents are dispersed with 2 mm glass beads in a paint shaker for 120 min.

1.6 g of the pigment concentrate thus produced are diluted with 24 g of a 25% binder solution and mixed homogeneously. The pigment concentrate thus produced is applied to a flexible PVC film (150 μm) with a no. 5 manual coater (wet film thickness 50 μm).

In the analysis with the colorimeter, the pigment composition of the invention is used as reference (type) and the commercially available naphthol pigments PR 147 and PR 184 are analyzed against this type.

Only in the case of 3.5 times the starting weight do the commercially available naphthol pigments attain similar color intensities to the pigment composition of the invention. The hue of the comparative pigments in each case is much yellower (dH=positive) and duller (dC=negative) than the pigment composition of the invention (table 6).

TABLE 6

| Pigment | Pigment conc. [%] | Color intensity [%] | dH | dC |
|---|---|---|---|---|
| Synthesis example 1 | 3.5 | 100 | 0 | 0 |
| PR 147 (comparative) | 12* | 105 | 2.12 | −1.37 |

TABLE 6-continued

| Pigment | Pigment conc. [%] | Color intensity [%] | dH | dC |
|---|---|---|---|---|
| PR 184 (comparative) | 12* | 107 | 6.36 | −3.03 |

*The pigment concentration had to be increased to 12% in order to attain comparable color intensities to synthesis example 1.

The invention claimed is:

1. A colorant comprising a pigment mixture, wherein the pigment mixture comprises at least one pigment of each of the formulae (IIIa) and (IIIb)

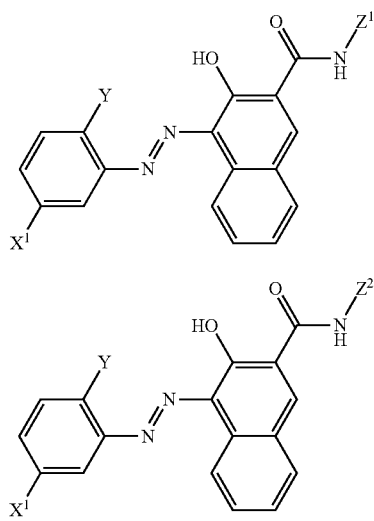

wherein, independently of one another, $X^1$ is $C_1$-$C_2$-alkylcarbannoyl or di($C_1$-$C_2$)-alkylcarbamoyl;

Y is methyl, methoxy, ethyl or ethoxy;

$Z^1$ is phenyl or a phenyl substituted by one, two or three radicals selected from the group consisting of methyl, ethyl, methoxy, ethoxy and chlorine;

$Z^2$ is nitrophenyl or cyanophenyl, and wherein the pigments of the formulae (IIIa) and (IIIb) are different.

2. The colorant as claimed in claim 1, wherein $X^1$ is methylcarbamoyl;

Y is methoxy;

$Z^1$ is methylphenyl; and $Z^2$ is nitrophenyl.

3. The colorant as claimed in claim 1, wherein the pigment mixture contains 1% to 99% by weight of a component of the formula (IIIa) and 99% to 1% by weight of a component of the formula (IIIb) based in each case on the total weight of the pigment mixture.

4. The colorant as claimed in claim 1, further comprising at least one auxiliary selected from the group consisting of surfactants, pigmentary dispersants, nonpigmentary dispersants, fillers, suspending agents, resins, waxes, defoamers, dust suppressants, extenders, shading colorants, preservatives, drying retardants, rheology control additives, wetting agents, antioxidants, UV absorbers, light stabilizers and combinations thereof.

5. The colorant as claimed in claim 4, wherein the shading colorant is a quinacridone pigment or an azo pigment.

6. An ink comprising the colorant as claimed in claim 1.

7. A printing ink comprising a pigment mixture including at least one pigment of each of the formulae (IIIa) and (IIIb)

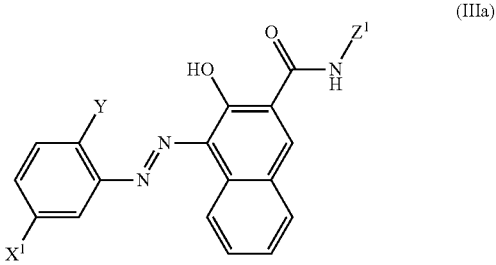

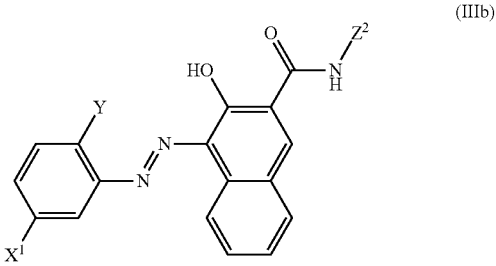

wherein, independently of one another, $X^1$ is $C_1$-$C_2$-alkylcarbannoyl or di($C_1$-$C_2$)-alkylcarbamoyl;

Y is methyl, methoxy, ethyl or ethoxy;

$Z^1$ is phenyl or a phenyl substituted by one, two or three radicals selected from the group consisting of methyl, ethyl, methoxy, ethoxy and chlorine;

$Z^2$ is nitrophenyl or cyanophenyl, and wherein the pigments of the formulae (IIIa) and (IIIb) are different.

8. The printing ink as claimed in claim 7, wherein $X^1$ is $C_1$-$C_2$-alkylcarbamoyl;

Y is methoxy;

$Z^1$ is methylphenyl; and $Z^2$ is nitrophenyl.

9. An electrophotographic toner or developer comprising a pigment mixture including at least one pigment of each of the formulae (IIIa) and (IIIb)

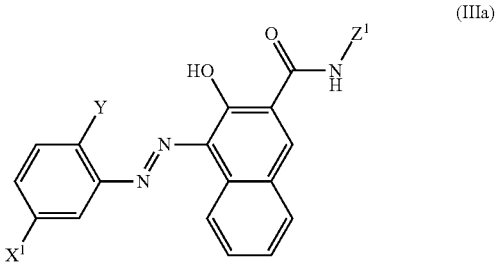

-continued

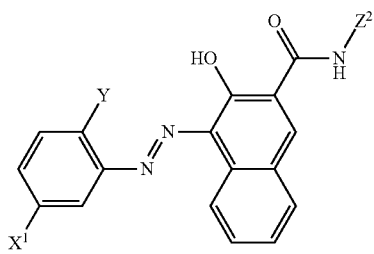
(IIIb)

wherein, independently of one another,
$X^1$ is $C_1$-$C_2$-alkylcarbamoyl or di($C_1$-$C_2$)-alkylcarbamoyl;
Y is methyl, methoxy, ethyl or ethoxy;
$Z^1$ is phenyl or a phenyl substituted by one, two or three radicals selected from the group consisting of methyl, ethyl, methoxy, ethoxy and chlorine;
$Z^2$ is nitrophenyl or cyanophenyl, and
wherein the pigments of the formulae (IIIa) and (IIIb) are different.

10. The electrophotographic toner or developer as claimed in claim 9, wherein
$X^1$ is $C_1$-$C_2$-alkylcarbamoyl;
Y is methoxy;
$Z^1$ is methylphenyl; and
$Z^2$ is nitrophenyl.

11. An inkjet ink comprising a pigment mixture including at least one pigment of each of the formulae (IIIa) and (IIIb)

(IIIa)

(IIIb)

wherein, independently of one another,
$X^1$ is $C_1$-$C_2$-alkylcarbannoyl or di($C_1$-$C_2$)-alkylcarbamoyl;
Y is methyl, methoxy, ethyl or ethoxy;
$Z^1$ is phenyl or a phenyl substituted by one, two or three radicals selected from the group consisting of methyl, ethyl, methoxy, ethoxy and chlorine;
$Z^2$ is nitrophenyl or cyanophenyl, and
wherein the pigments of the formulae (IIIa) and (IIIb) are different.

12. The inkjet ink as claimed in claim 11, wherein
$X^1$ is $C_1$-$C_2$-alkylcarbamoyl;
Y is methoxy;
$Z^1$ is methylphenyl; and
$Z^2$ is nitrophenyl.

13. A toner cartridge set comprising a yellow, magenta, cyan and black toner cartridge, wherein the magenta cartridge contains a toner comprising a pigment mixture including at least one pigment of each of the formulae (IIIa) and (IIIb)

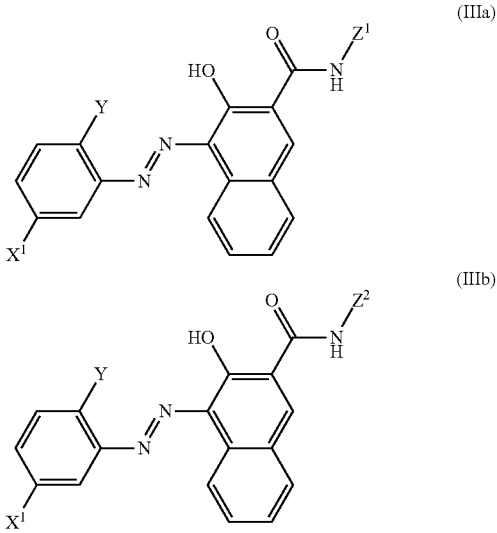

wherein, independently of one another,
$X^1$ is $C_1$-C2-alkylcarbamoyl or di($C_1$-$C_2$)-alkylcarbamoyl;
Y is methyl, methoxy, ethyl or ethoxy;
$Z^1$ is phenyl or a phenyl substituted by one, two or three radicals selected from the group consisting of methyl, ethyl, methoxy, ethoxy and chlorine;
$Z^2$ is nitrophenyl or cyanophenyl, and
wherein the pigments of the formulae (IIIa) and (IIIb) are different.

14. The toner cartridge set as claimed in claim 13, wherein
$X^1$ is $C_1$-$C_2$-alkylcarbamoyl;
Y is methoxy;
$Z^1$ is methylphenyl; and
$Z^2$ is nitrophenyl.

15. An inkjet ink set comprising a yellow, magenta, cyan and black ink cartridge, wherein the magenta ink cartridge contains an inkjet ink comprising a pigment mixture including at least one pigment of each of the formulae (IIIa) and (IIIb)

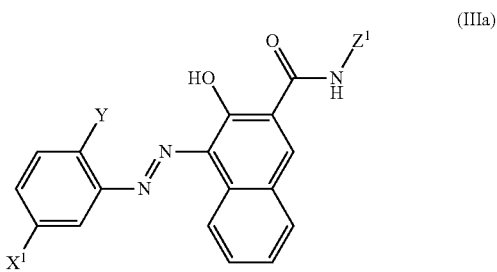
(IIIa)

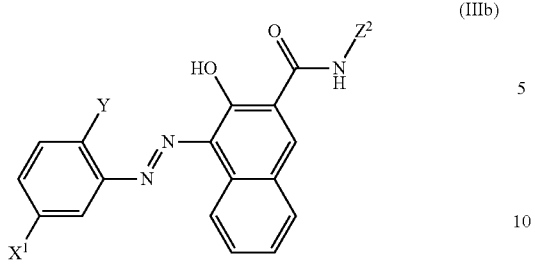

(IIIb)

wherein, independently of one another, $X^1$ is $C_1$-$C_2$-alkylcarbamoyl or di($C_1$-$C_2$)-alkylcarbamoyl;

Y is methyl, methoxy, ethyl or ethoxy;

is phenyl or a phenyl substituted by one, two or three radicals selected from the group consisting of methyl, ethyl, methoxy, ethoxy and chlorine;

$Z^2$ is nitrophenyl or cyanophenyl, and wherein the pigments of the formulae (IIIa) and (IIIb) are different.

16. The inkjet ink set as claimed in claim 15, wherein $X^1$ is $C_1$-$C_2$-alkylcarbamoyl;

Y is methoxy;

$Z^1$ is methylphenyl; and $Z^2$ is nitrophenyl.

* * * * *